United States Patent [19]

Yablans

[11] Patent Number: 5,131,563
[45] Date of Patent: Jul. 21, 1992

[54] STRUCTURE AND METHOD OF MAKING AN ARTICLE DISPENSING APPARATUS

[75] Inventor: Gerald Yablans, Port Washington, N.Y.

[73] Assignee: Pop Displays, Inc.

[21] Appl. No.: 555,520

[22] PCT Filed: May 11, 1990

[86] PCT No.: PCT/US90/02663

§ 371 Date: May 11, 1990

§ 102(e) Date: May 11, 1990

[51] Int. Cl.⁵ .............................................. B65G 59/00
[52] U.S. Cl. ...................................... 221/92; 221/124; 221/131; 221/279; 221/280; 312/42; 312/71
[58] Field of Search ............... 221/92, 123, 124, 131, 221/191, 193, 195, 279, 280, 311; 312/35, 42, 45, 71, 72, 73; 211/49.1, 59.2, 59.3

[56] References Cited

U.S. PATENT DOCUMENTS

| 2,806,631 | 9/1957 | Van Vactor | 221/279 X |
| 4,042,096 | 8/1977 | Smith | 221/279 X |
| 4,106,668 | 8/1978 | Gebhardt et al. | 221/279 X |
| 4,243,145 | 1/1981 | Woodhead | 221/131 X |
| 4,515,290 | 5/1985 | Fishler | 221/191 |

FOREIGN PATENT DOCUMENTS 363772 9/1962 Switzerland ................. 221/280

Primary Examiner—David H. Bollinger
Attorney, Agent, or Firm—Nolte, Nolte and Hunter

[57] ABSTRACT

A structure and method of making a compartmented display dispenser comprising two molded halves directly joinable to form the case and having formed guideways to receive a moldable pusher in each compartment for dispensing merchandise stored and displayed in the compartments.

20 Claims, 5 Drawing Sheets

STRUCTURE AND METHOD OF MAKING AN ARTICLE DISPENSING APPARATUS

This invention relates to an inexpensive method of constructing a display dispenser for small articles such as might be utilized on the counter of a retail store or department store. Such dispensers should be lightweight and be capable of production at low cost and be attractive in appearance. They are normally constructed of plastic except for metal springs and the like.

The apparatus constructed in accordance with the teachings of U.S. Pat. No. 4,515,290 is in use. Constructing the apparatus taught in this patent is time-consuming and labor-intensive. For example, the labor to secure the many partitions 12 in proper assembly is great. In addition, tolerance deviations in the interlocking members for interlocking the partitions into the ganged array are cumulative and can result in an error of half an inch to an inch in a 14" wide structure used for dispensing lipsticks. Accordingly, it is an object of my invention to provide a method and structure for a multi-channel dispensing device in which tolerance deviations are not cumulative and the labor of assembly is greatly reduced.

It is an object of my invention to form a dispensing device having multiple chambers for dispensing articles which is simple in construction and which may be formed from two molded sections readily joined together in abutting relationship to avoid assembling multiple molded partitions which must be secured to each other with the attendant problems of cumulative error.

In addition, my structure may preferably be arranged so that the pusher can be withdrawn for loading so that, if desired, merchandise last loaded is last delivered. This feature cannot be performed by prior cabinet structures known to me.

BRIEF DESCRIPTION OF THE INVENTION

Figure 1:
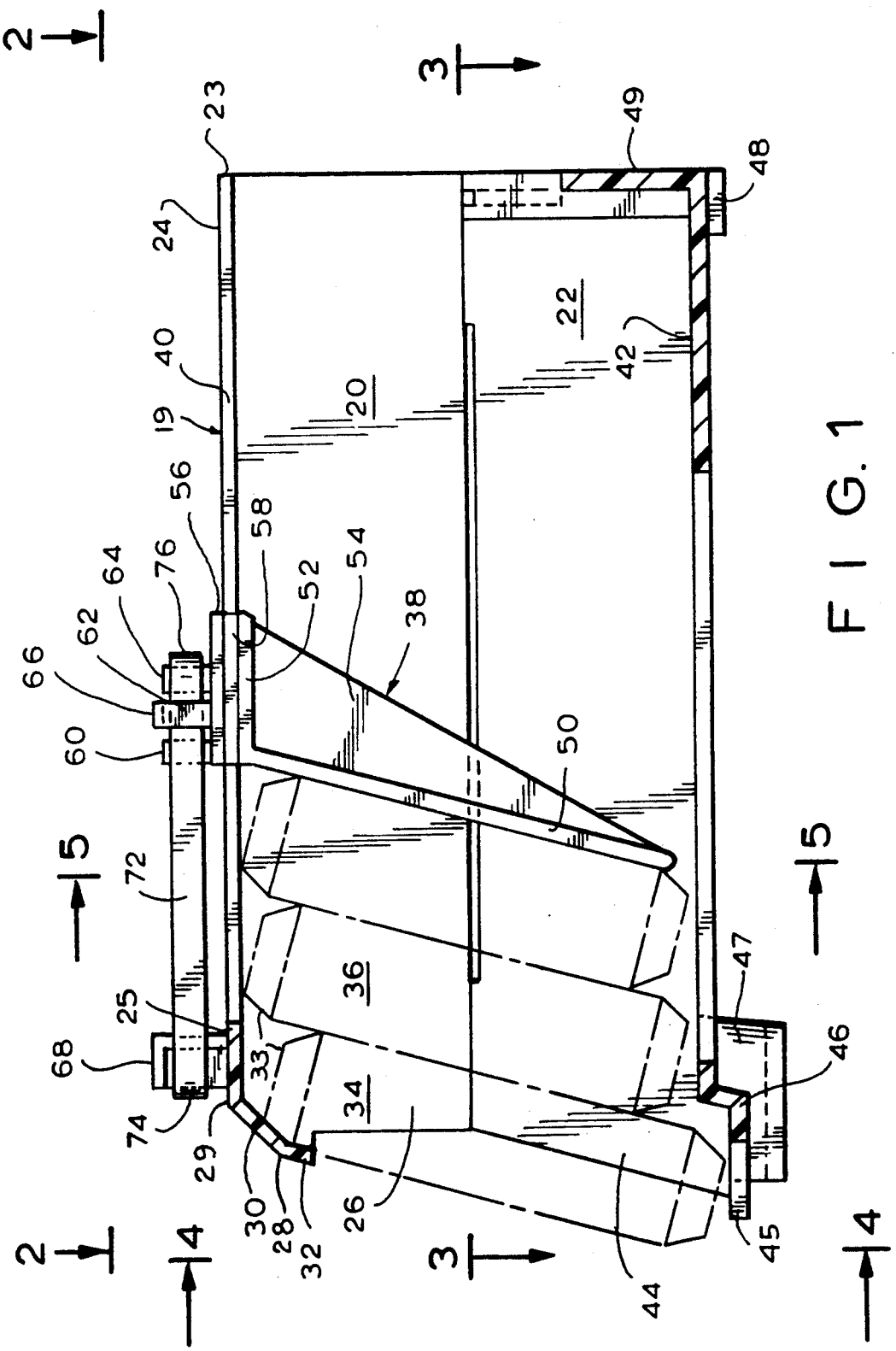
FIG. 1 is a sectional side elevation taken on line 1—1 of FIG. 2 with articles being dispensed shown in dash-dot phantom.

It should be understood that this apparatus can be oriented in any selected way. The terms front, rear, top and bottom as used herein refer only to the orientation as presented in the drawings for clarity and understanding.

Referring now to the drawings, a dispenser (see FIGS. 1, 2, 3 and 6) is positioned so that its delivery end (herein called "front") is toward the left. It should be clearly understood that FIG. 1 might be rotated 90° clockwise so that the delivery end is upward or 90° counterclockwise so that the delivery end is downward. Obviously, it may also be rotated 180° so that its delivery end is to the right and the top and bottom, as shown in FIG. 1, are reversed. For simplicity unless otherwise stated, the following description will refer to the orientation illustrated in the drawings, however, any other position may be preferred for certain adaptations and while the structure shown is a preferred embodiment, the orientation or attitude illustrated is not necessarily preferred in all cases as a person skilled in the art would know.

Figure 5:
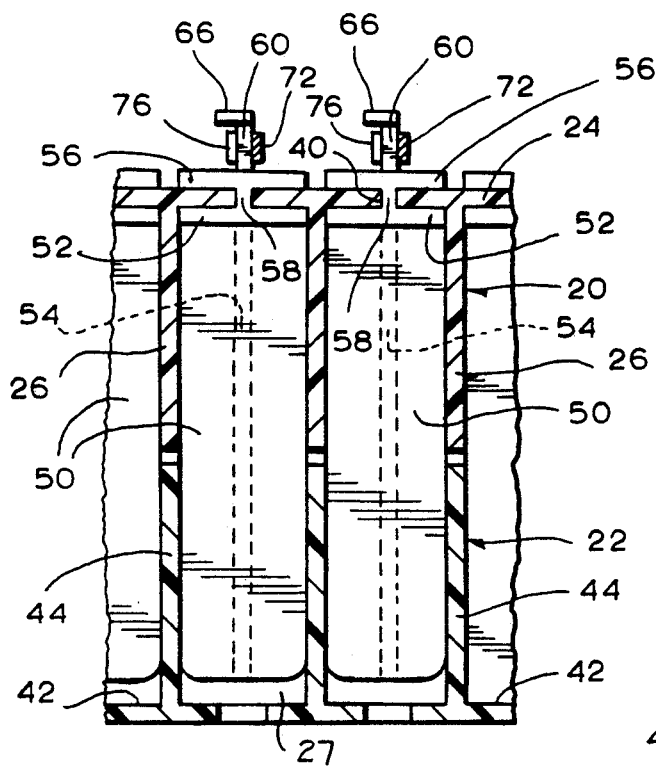
FIG. 5 is a fragmentary sectional elevation showing two chambers taken on the line 5—5 of FIG. 1.
Figure 6:
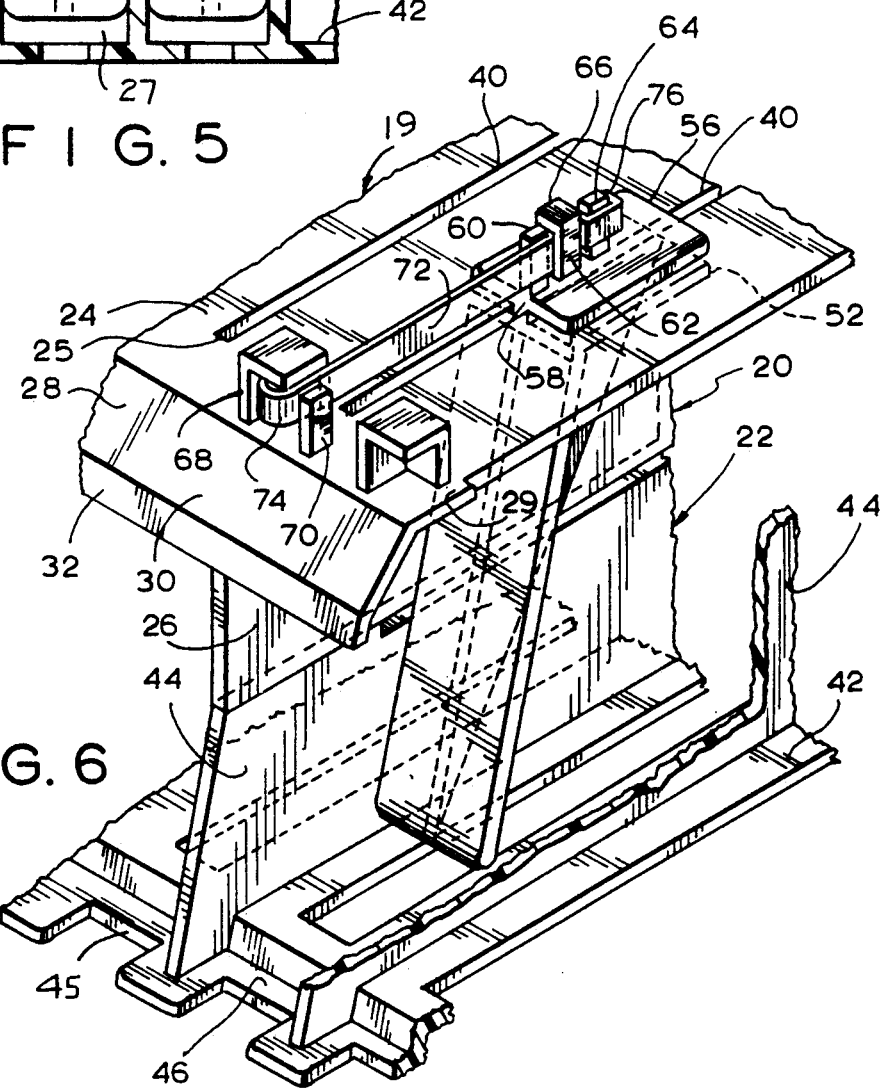
FIG. 6 is fragmentary isometric view partly cutaway, illustrating a chamber with its pusher mechanism.

Referring to FIGS. 5 and 6, there is shown a fragment of the cabinet 19 formed of an upper section 20 and a lower section 22. The sections 20, 22 are joined at 21 as by welding or adhesive in abutting relationship. This may best be done in a jig which can insure the abutting relationship while the sections 20, 22 are secured to each other.

Upper section 20, formed as a single plastic casting has a panel 24, from which extend a plurality of integral spaced dividers or partitions 26. Panel 24 has toward the delivery or front end, a delivery lip 28, having two lip portions 30 and 32. As may be seen clearly in FIGS. 1 and 6, the lip portion 30 is angled downward to form a lip stop with the further angled portion 32.

Figure 2:
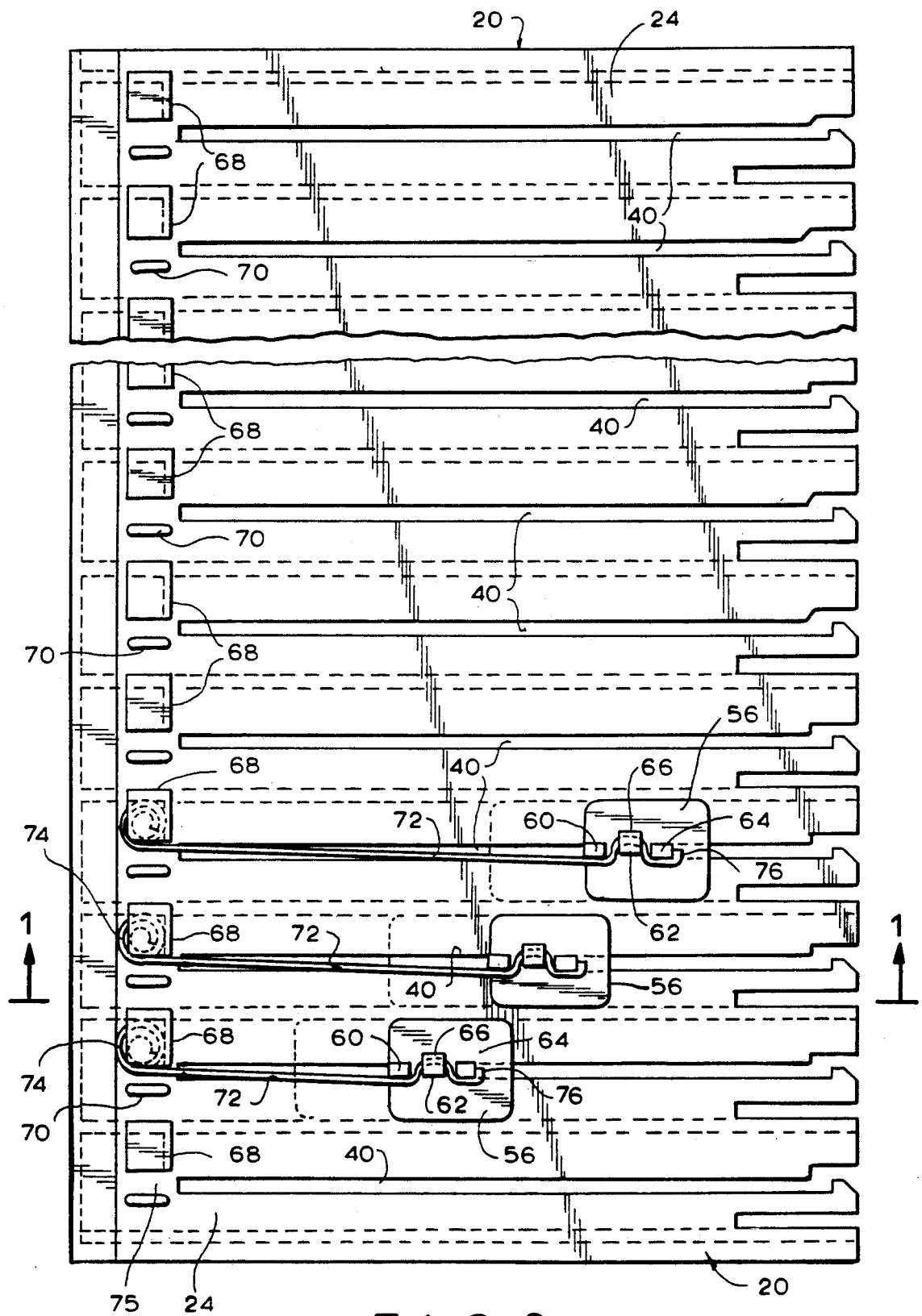
FIG. 2 is a plan view taken on line 2—2 of FIG. 1.
Figure 3:
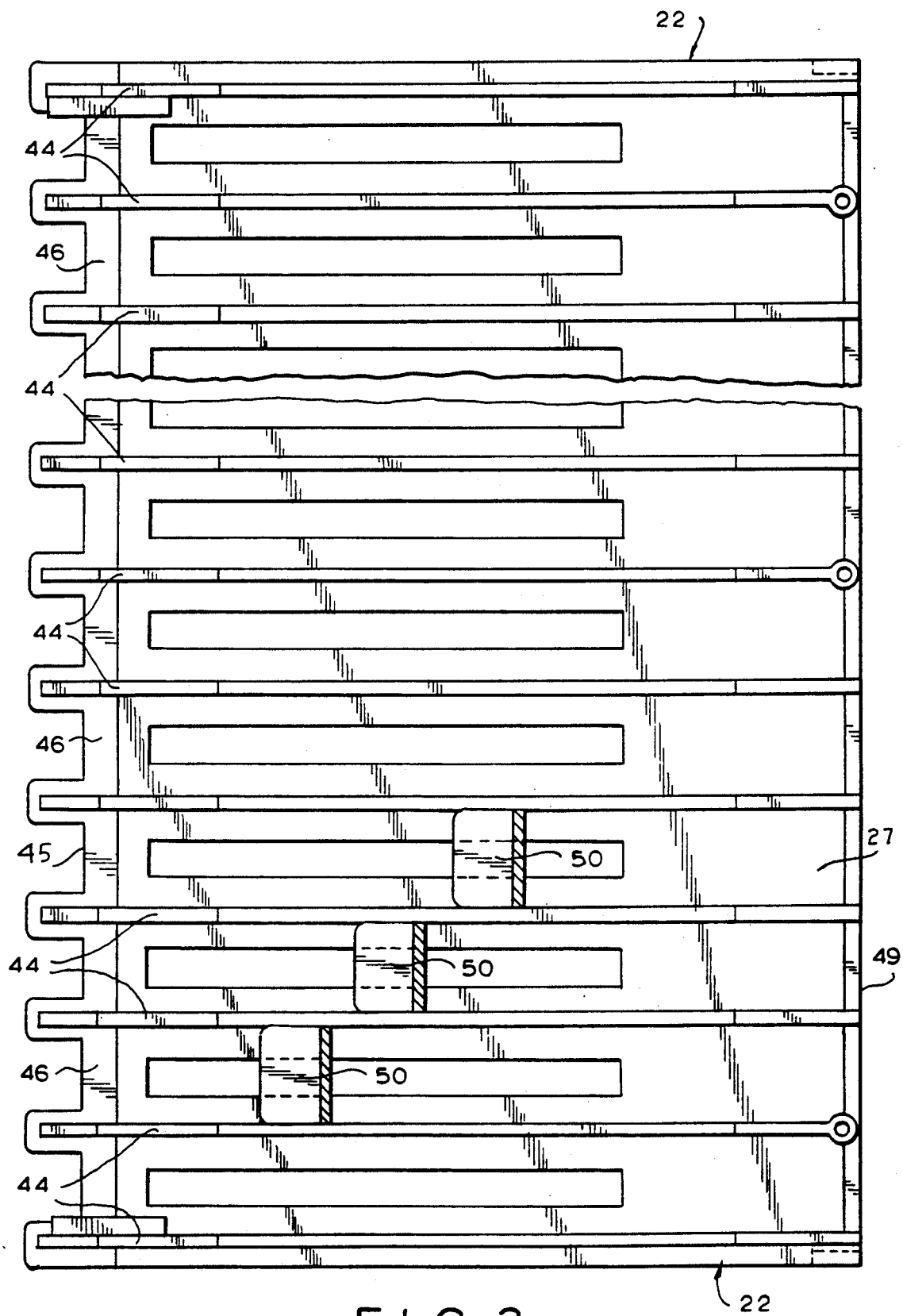
FIG. 3 is a horizontal section taken on line 3—3 of FIG. 1.

Panel 24 has formed in it slots or guides 40 intermediate the partitions 26. Slot 40 is blind at the forward end toward portion 29 of the panel 24. FIG. 2 shows the other or rearward end 41 open to permit removal of pusher 38 as hereinafter explained.

Figure 4:
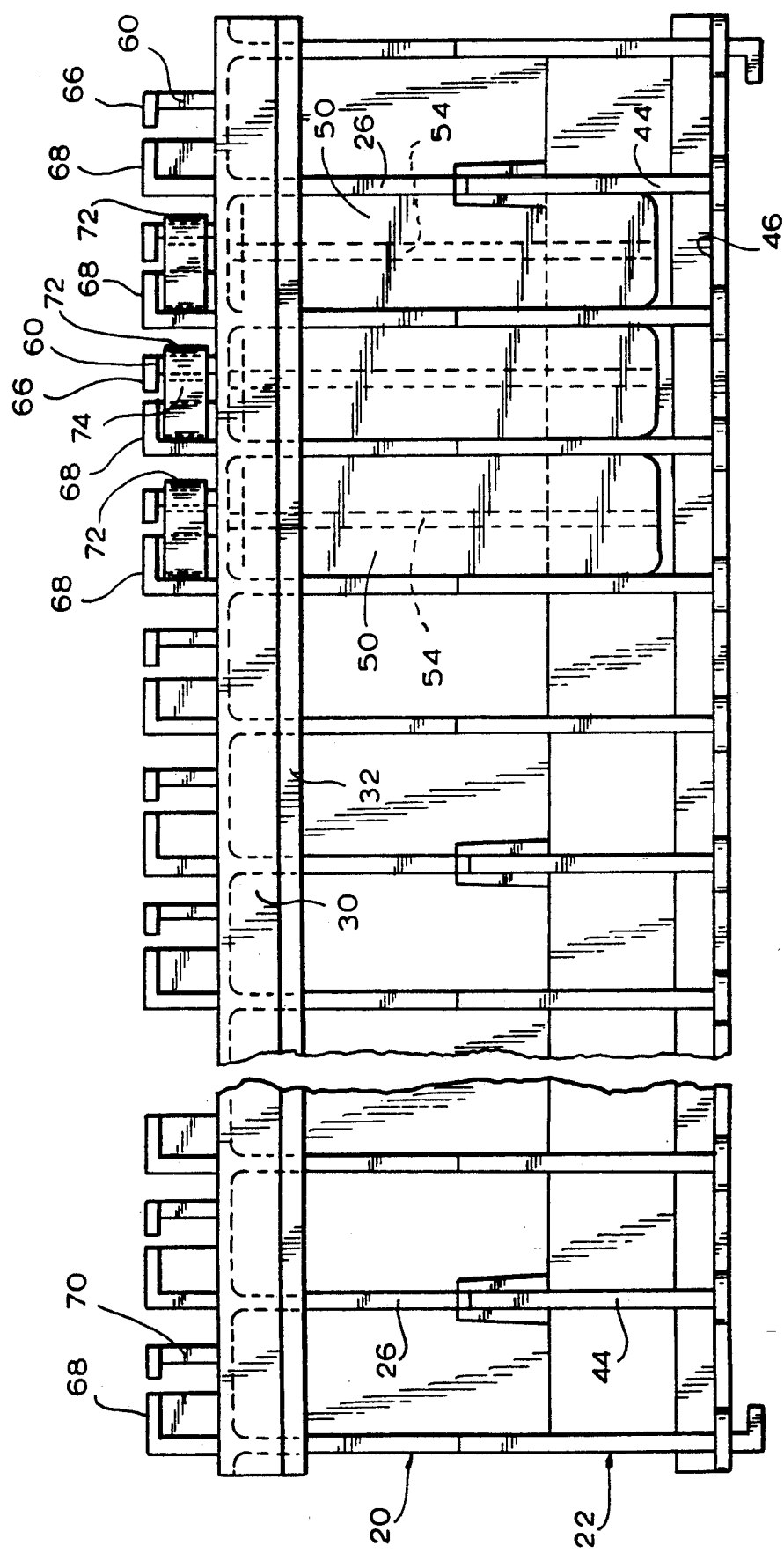
FIG. 4 is a front elevation as seen on line 4—4 of FIG. 1.

Referring to FIGS. 4, 5, and 6, the lower section 22 formed as a single mold casting has a panel 42 from which extends a plurality of integral spaced dividers or partitions 44 corresponding in spacing and shaped similarly but not identically (see FIGS. 1 and 6) to the partitions 26 of the upper section 20. The panel 42 is formed with integral step 46 juxtaposed to lip portions 30, 32. If the display dispenser is to be used in the orientation shown in the drawings, integral legs 47 and 48 may be formed on the bottom of section 22.

It is evident that the partitions 26, 44 could be welded or otherwise adhered to the panels 24, 42, respectively. Such an arrangement would not alter the advantages of eliminating the accumulation of tolerance errors. However, the simplicity of sections 20 and 22 accommodates itself to molding which, of course, further reduces costs in production.

As may be seen in FIGS. 1, 4, 5 and 6, the display dispenser cabinet is formed by bringing the upper section 20 and the lower section 22 together juxtaposed in abutting mating relationship, aligning and joining, as by adhesive or welding, the partitions 26 to corresponding partitions 44. When so joined, partitions 26, 44 form partitions 27 to define compartment 25. The abutting edges of the partitions 26, 44 are shaped to conform the one with the other. As will be evident to those skilled in the art, it may be unnecessary to join each abutting portion 26 to its corresponding partition 44. Also, the joining along the abutting edges may be discontinuous.

In the formed cabinet step 46 and delivery lip 28 permit a releasable hold on the forward article 34 which is cammed to drop to the position shown in FIG. 1 under the urging of pusher 38 and any intervening articles 36. Leading article 34 is then releasably retained by lip portions 32, 30 bearing on its chamfer 33.

A customer can then engage article 34 through slot 45 to complete the dispensing or discharge of article 34. Article 36 then is propelled forward to take the article 34 position.

Since each section 20 or 22 is a unitary or integral structure, tolerance errors between the dividers are non-cumulative and can be compensated by a jig or operator during joining of the two sectors 20, 22.

Pusher 38 is an integral molding having an article engaging plate 50, a foot 52 and a stabilizing web 54. A slider 56 is integral with a spacer 58 integral with the foot 52. Spacer 58 is received in slot 40. The slide may be removed from slot 40 by passing spacer 58 through opening 41. Opening 41 may be tortuous in form providing feet 41c on legs 41b of panel 24 to prevent inadvertent removal of pusher. Short slots 41d adjacent each slot 40 renders the legs 41b of panel 24 resilient to be bent laterally to permit spacers 58 to pass from and into slots 40 past feet 41c. Integral with or secured to the slider 56 are three posts 60, 62 and 64. Central post 62 is shaped as an inverted L to provide the hold down 66 for leading end 76 of spring 74. The end 76 is warped about the three posts 60, 62 and 64.

Formed on the portion 29 of panel 24 are small receptacles or chambers 68 to the fore of the forward terminus of the slot 40. An upstanding post 70 is provided adjacent each receptacle 68. Post 70 is spaced a slight distance from the chamber 68 to accommodate passage of portion 72 of the coiled tension spring 74. Chamber 68 is sized to receive and restrain the coil of tension spring 74 while portion 72 passes through the opening between post 70 and chamber 68. The leading or free end 76 of the withdrawn portion 72 of spring 74 is fastened to the pusher 38 as described above. The spacer 58 of pusher 38 rides in a slot 40 and is retained there by foot 52 and slider 56. Tension of coiled spring 74 biases pusher 38 to the delivery or front end of the display dispenser cabinet 19 to move or sweep articles before it in compartment 27 in a direction parallel partitions 26, 44.

Figure 7:
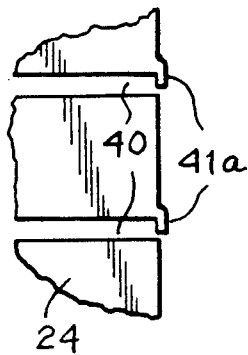
FIG. 7 shows a variation in the closure of the pusher guide openings.

Referring to FIG. 7, there is shown a variation from the opening 41 at the rear end of the guide slot 40. A live hinge 41a made of any flexible material extends across the rearward opening of the slot 40 to permit removal and insertion of the spacer 58 of pusher 38. Of course any suitable latching or unlatching device may be employed or none at all since spring 74 resists movement of pusher 38 out of guide 40.

I have shown my novel dispensing cabinet and novel method of construction in connection with dispensing lipstick cases but modifications can be made to accommodate other articles without departing from the invention.

I claim:

1. The method of making a multi-column cabinet comprising constructing a first portion as a panel having a plurality of parallel spaced upstanding dividers, constructing a second portion as a second panel having a plurality of parallel spaced upstanding dividers, spacing the dividers on each portion a distance corresponding to distances of the spacing on the other portion, shaping the remote edges of said dividers of one portion to engage the remote edges of the dividers of the other portion, bringing said portions together in juxtaposition so that said panels are remote from each other and said dividers are in edgewise contact, aligning said dividers the one to the other, and securing in contact said aligned dividers to form a single cabinet having a plurality of chambers defined by said dividers and said panels.

2. The method set forth in claim 1 further characterized by the step of mold casting at least one of said portions.

3. A method of making a dispensing device comprising constructing a first portion as a panel having a plurality of parallel spaced upstanding dividers, constructing a second portion as a second panel having parallel upstanding spaced dividers spaced a distance corresponding to the spacing of said first named dividers on said first names panel, forming a guideway on said second named panel parallel to and between each of said dividers, forming a plurality of pusher members to move slidably along said guideways, bringing said first named panel and its dividers and said second named panel and its dividers into juxtaposition, the one to the other, the panels being remotely positioned and said dividers in edge wise contact between said panels, securing said panels the one to the other so that said dividers form chambers, positioning said pusher members in said chambers and slidably along said guideways.

4. The method recited in claim 3 and further characterized by the step of securing to one of said panels at least one biasing device to contact and move at least one of said pushers in one direction through at least one of said chambers to yieldingly move goods through said chamber in a direction parallel at least one of said panels under the bias of said biasing device.

5. A method recited in claim 4 and further characterized by the step of forming on said second named panel securing means, adjacent an end of said guide, forming other securing means on at least one of said pushers and resiliently connecting said securing means on said panel and said securing means on said pusher by a yieldable biasing means.

6. The method recited in claim 3 and further characterized by the step of forming on one of said panels securing means, forming other securing means on at least one of said pushers and connecting said securing means on said panel and said securing means on said pusher by a yieldable biasing means.

7. The method recited in claim 3 and further characterized by the steps of forming securing means on one of said panels forming a further securing means on at least one of said pushers, at least one of said securing means formed as a housing capable of enclosing the coil of a coiled spring and having a slot for a portion of said spring to extend, the other of said securing means formed as a post to which said portion of said coil spring may be secured and inserting the coil of a coiled spring in said housing and the free portion of said spring through said slot and about said post.

8. The method as set forth in claim 3, 4 or 7 and further characterized by the steps of forming a lip on at least one of said panels extending toward the other of said panels to arrest movement of articles from said chambers by said pusher.

9. The method set forth in claim 3 further characterized by the step of mold casting at least one of said portions.

10. In a device for feeding one by one each column of a multiple procession of cylindrical objects having chamfered ends said device comprising a first panel, a second panel spaced substantially parallel to but spaced from said first panel, a plurality of spaced dividers connecting said panels the one to the other and defining chambers constructed and arranged to receive in each chamber a plurality of objects, each of said chambers having a delivery end, the first named panel being stepped in a direction away from said second named panel adjacent its delivery end, said second named panel having an oppositely positioned step toward said first named panel, said step having a terminal lip angled toward said first named panel, guide means formed in one of said panels, a pusher slidably mounted in said guide means to move in a chamber to and from said delivery end and biasing means urging said pusher toward said delivery end of said chamber, said pusher, said lip and said step constructed and arranged to move the foremost of said objects, urged by said pusher, toward said delivery end, away from said second named panel into the step of said first named panel and said lip on said second named panel retains said object in concert with said pusher urged by said biasing means.

11. The device as set forth in claim 10 and further characterized in that said biasing means is a coiled flat spring having a coiled end and a leading end, first securing means comprising a chamber to secure the coiled end of said spring and second securing means to secure the leading end, one of said securing means being attached to one of the group consisting of said panels and said dividers and the other of said securing means secured to said pusher.

12. The device set forth in claim 10 further characterized in that said guide means is a slot open at the end distal from said delivery end and means at said distal end to selectively release said pusher from said guide means.

13. Display cabinet, a first panel having a plurality of parallel spaced upstanding dividers secured integral with said panel, a second panel having a plurality of spaced parallel dividers integrally secured to said panel, dividers of the first named panel being spaced to correspond to dividers of said second named panel, said panel being secured in a position juxtaposed to each other, the edges of the dividers distal from their respective panel engaging the distal edges of the corresponding dividers of the other of said panels to form a multicompartmental cabinet, the panels forming opposing outer walls of said cabinet and at least one of said panels has an elongated opening formed intermediate adjacent dividers and a pusher positioned between said adjacent dividers and slidably supported in said opening.

14. Device as set forth in claim 13 and further characterized by biasing means moving said pusher in said opening to sweep a substantial distance parallel said adjacent dividers.

15. Device as set forth in claim 14 and further characterized in that said biasing means is a flat coil spring, a coil of said spring being retained in a housing and the free end of said spring extending outside said housing, said housing being secured to one of the group comprising said panel and one of said pushers, and said free end of said coil spring secured to the other of said group.

16. Device in accordance with claims 14 or 15 and further characterized by at least one of said panels having a lip along an edge adjacent an open delivery end of said cabinet, said lip extending inwardly toward the other of said panels to partially block the exit from the compartments defined by said dividers.

17. In a display cabinet, a first panel having a plurality of integral parallel spaced upstanding dividers, a second panel substantially parallel to said first panel and spaced therefrom, said second panel being secured to the edges of said dividers distal from said first panel, a guideway formed in at least one of said panels and between a pair of adjacent dividers and a pusher slidably mounted in said guideway and constructed and arranged to sweep between said adjacent pair of dividers.

18. A device substantially as set forth in claim 17 and further characterized by yieldable biasing means urging said pusher in one direction between said adjacent pair of dividers.

19. A device as set forth in claim 18 and further characterized in that said biasing means is a flat coiled spring.

20. A display cabinet, a first panel having a plurality of integral parallel spaced upstanding dividers, a second panel having a plurality of integral spaced parallel dividers, dividers of said first named panel being spaced to correspond to the dividers of said second named panel, said panels being secured in a position juxtaposed to each other, the edges of the dividers distal from their respective panel engaging the distal edges of the corresponding dividers of the other said panels to form a multi-compartment cabinet, panels forming opposing outer walls of said cabinet, and said cabinet being constructed by the method of claims 1, 3, 4, 6, 5, 7, 2 or 9.

* * * * *